March 20, 1951      J. D. MAXWELL      2,545,964
PHOTOGRAPHIC COPY BOARD
Filed May 7, 1949      2 Sheets-Sheet 1
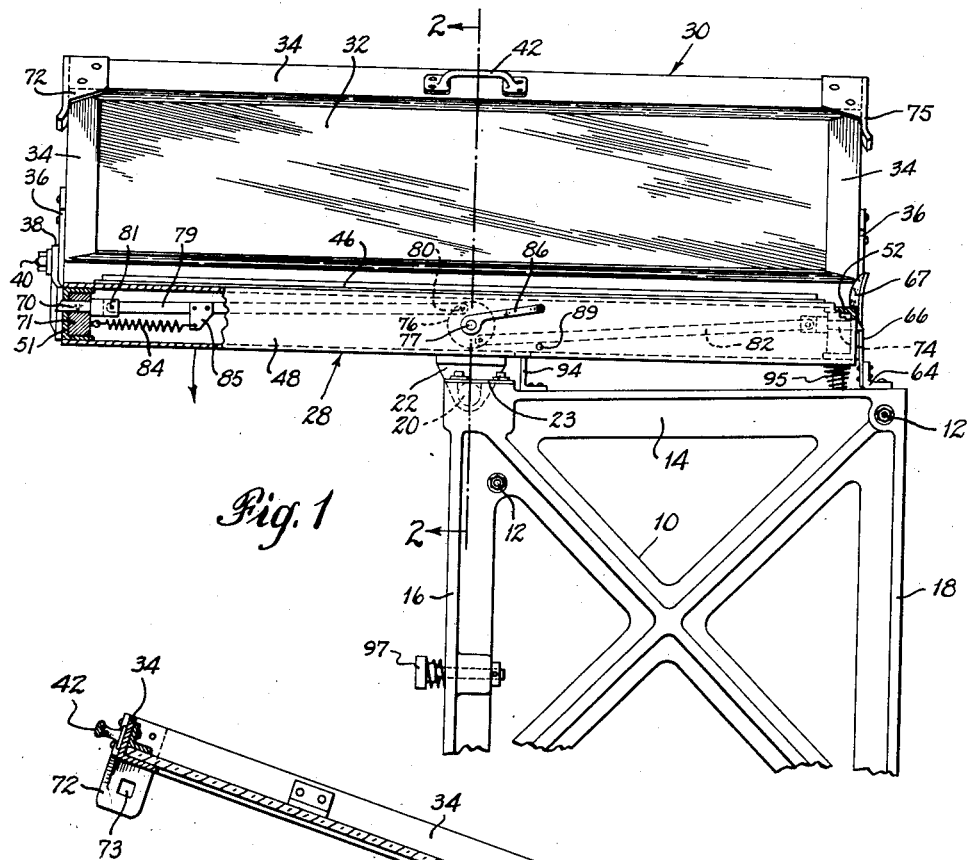
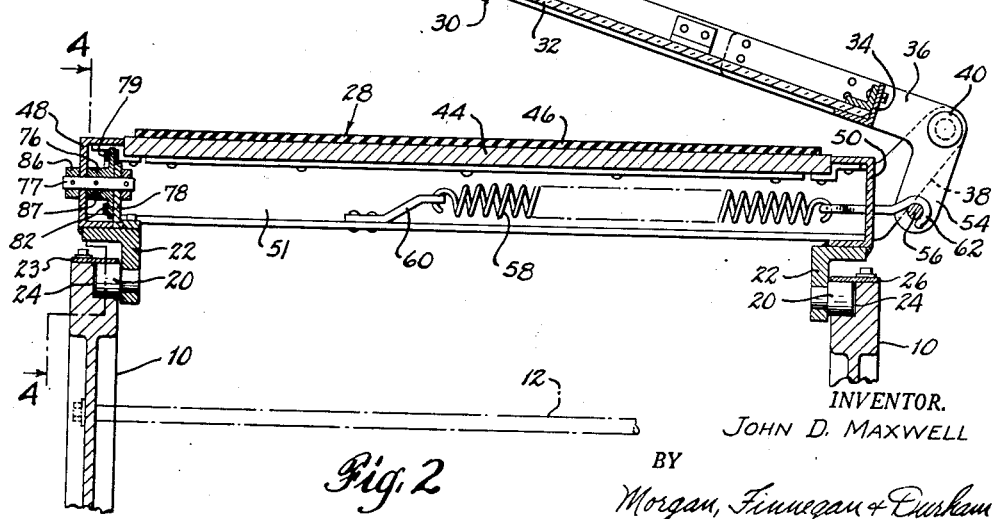
INVENTOR.
JOHN D. MAXWELL
BY
Morgan, Finnegan & Durham
ATTORNEYS.

March 20, 1951 J. D. MAXWELL 2,545,964
PHOTOGRAPHIC COPY BOARD
Filed May 7, 1949 2 Sheets-Sheet 2
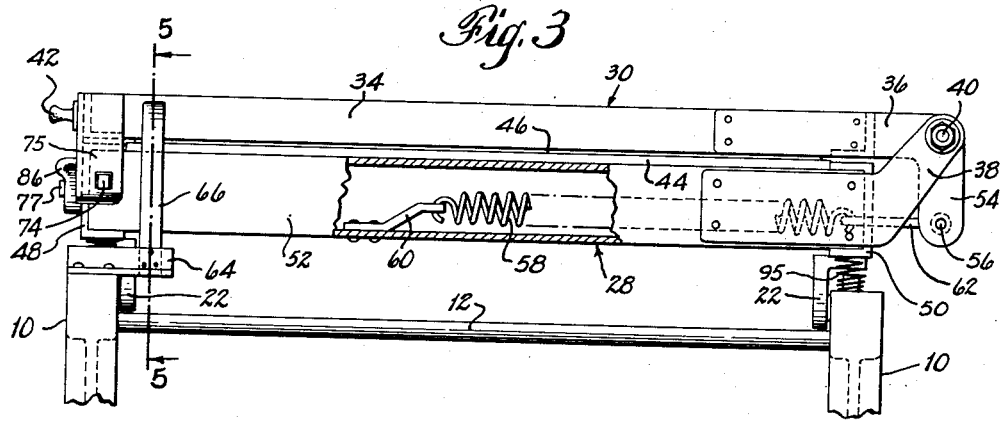
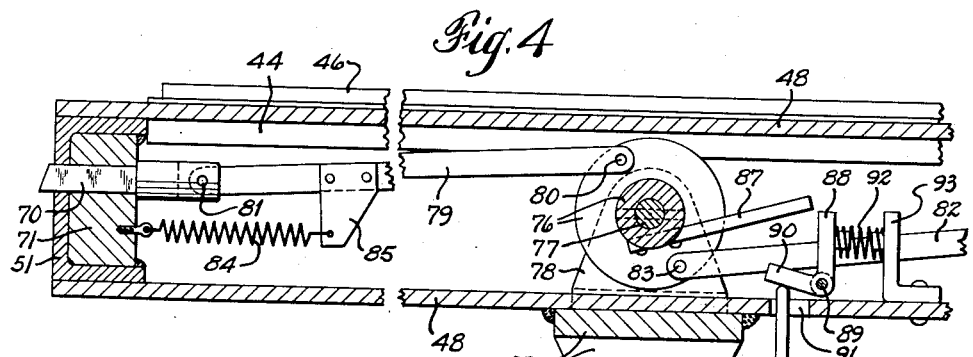
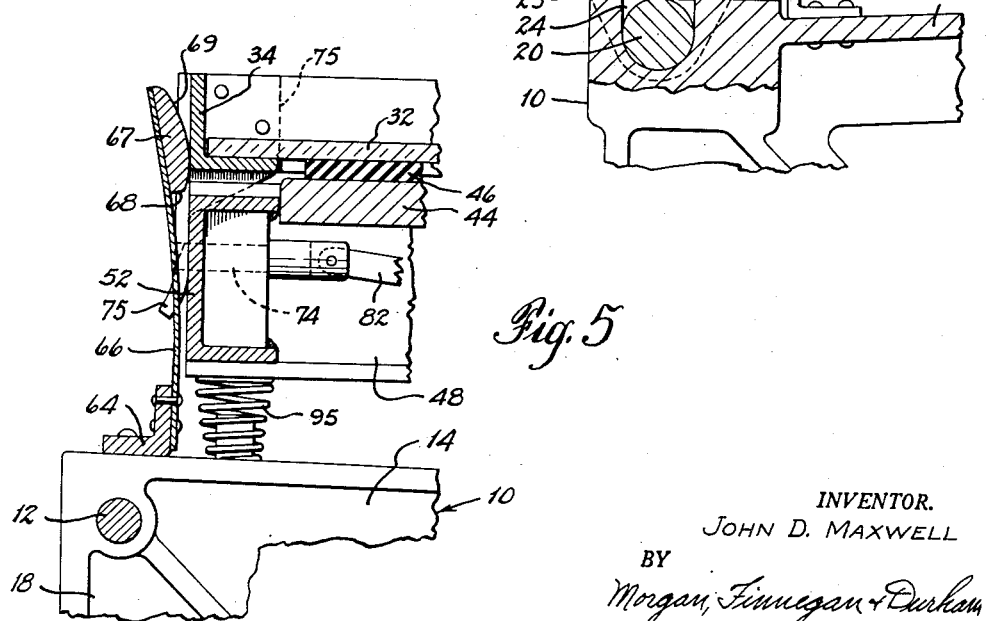
INVENTOR.
JOHN D. MAXWELL
BY Morgan, Finnegan & Durham
ATTORNEYS.

Patented Mar. 20, 1951

2,545,964

UNITED STATES PATENT OFFICE 2,545,964

PHOTOGRAPHIC COPY BOARD

John D. Maxwell, Glen Head, N. Y., assignor to Powers Photo Engraving Company, Glen Cove, N. Y., a corporation of New York Application May 7, 1949, Serial No. 92,029

3 Claims. (Cl. 88—24)

The invention relates to copy boards for photoengraving and other cameras.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation, partly broken away, showing an illustrative and preferred form of a copyboard for use with photoengraving cameras;

Figure 2 is a transverse vertical section as viewed along the line 2—2 of Figure 1 and showing the copy board in open or loading position;

Figure 3 is an end elevation showing the cover glass closed but the copy board in non-printing position;

Figure 4 is an enlarged fragmentary section taken along the line 4—4 of Figure 2 and showing portions of the cover frame latching mechanism;

Figure 5 is an enlarged fragmentary section taken along the line 5—5 of Figure 3 and showing the latching means which, when released by opening the cover frame, locks the copy board in its horizontal or loading position.

The present invention has for its object the provision of a novel and improved copy board for holding relatively large copy and which is particularly useful in connection with photoengraving and photomechanical cameras. A further object is the provision of a copy board which permits the use of masking devices which may be larger in one or more dimensions than the copy board itself or the use of masking devices in such positions that a portion of the mask may project outside of the margins of the copy board. Another object is the provision of means to insure that certain steps in the operation of the board can only be performed under conditions and at such a time as to eliminate possible damage to the board.

Referring now in detail to the present preferred and illustrative embodiment of the invention as shown in the accompanying drawings, a pair of supporting frames 10 are provided, one at either side of the structure, and interconnected by a plurality of rigid tie rods 12. Frames 10 may form part of additional structure (not shown) for supporting a camera for use in conjunction with the invention or may be formed as a simple base structure for floor use. Each frame 10 is provided with a substantially horizontal reach 14 and legs 16 and 18. The copy board is pivotally connected to each frame 10 at the frame corner where leg 16 and reach 14 join and is adapted to be swung between a horizontal or loading position and a vertical or exposure position. Such a provision may comprise a pair of trunnion pins 20 fixed in and extending laterally in opposite directions from a pair of angle brackets 22 which are secured, one at either side, on the underside of the copy board. Each trunnion pin 20 is journalled in a bearing recess 24 in each frame 10 and removably held therein by a retaining plate 26.

The copy board itself comprises a copy frame 28 and an overlying, transparent, cover frame 30 which is hinged to the copy frame so that it may be opened to give access to the upper surface of the copy frame for loading and arranging the subject material to be copied.

The cover frame 30 consists of a flat, transparent glass sheet 32 mounted in a surrounding metal frame 34. Hinge arms 36 are provided, one at each of the two rear corners (right in Figure 2) of the frame 34, and project a substantial distance beyond the rear side which connects these corners. Cooperating hinge arms 38 are secured to corresponding corners of the copy frame 28 and are pivotally connected to arms 36 by hinge pins 40. A handle 42 may be attached to the front side of frame 34 to assist in opening the copy board for loading or unloading.

It will be noted from a study of Figures 2 and 3 that the construction of the hinges is such as to leave the entire rear margin and adjacent sides of the copy board free of any obstructions in the plane of the work surface whether the cover frame 30 is open or closed. Thus, masks or other portions of work not to be photographed do not need to be trimmed to board size but may project beyond the margins thereof.

The copy frame 28 consists of a rigid, flat sheet or baseboard 44 of the desired size covered on one face with a pad 46 of sponge rubber or other resilient material on which the subject matter to be copied may be arranged when the copy board is in a horizontal position and the cover frame 30 is open, as shown in Figures 1 and 2. The baseboard 44 may be supported in a framework comprised of a front channel member 48, rear channel 50 and adjoining side channels 51 and 52. The copy board trunnion brackets 22, previously referred to, are secured to the underside (assuming the board to be in a horizontal position) of the front and rear channel members 48 and 50 at substantially their midsection.

Spring means are provided for actuating and counter-balancing the cover frame 30 so that when the copy board is in the horizontal position and the cover frame is unlocked from its closed condition the latter will automatically and gently open a desired amount and stay open without additional support until the operator has arranged the subject matter to his satisfaction on the pad 46 after which the cover frame may be lowered with little effort and automatically locked closed. As embodied, each hinge arm 36 on the cover frame 30 is provided with a depending leg 54, substantially at a right angle thereto, each of these legs 54 being interconnected to the other by a tie rod 56. Legs 54 are so proportioned that the tie rod 56 is spaced from and parallel to the rear channel member 50 and lies below the workin surface of the copy frame 28 so as not to interfere with subject matter which might extend beyond the rear side of the copy frame.

Tension springs 58 are provided one of which is concealed within each side channel 51, 52 and anchored at one end thereto by a bracket 60, the free ends being attached to hooks 62 which extend through suitable apertures in rear channel 50 and hook over the tie rod 56 at a point adjacent to each leg 54. Thus, springs 58 serve to open cover frame 30 by rocking it about hinge pins 40, and the extent to which it is raised above the copy frame 28 without manual assistance is determined by the strength of the springs 58. Further opening may of course be attained by manual effort.

When the copy board is in its horizontal loading position and the cover frame 30 raised, as shown in Figures 1 and 2, it is highly desirable that this horizontal position be positively maintained so that if an operator rested his weight on the side of the copy board removed from the supporting frames 10 the board would not swing about the trunnions 20 and spill the work and operator on the floor. It is also desirable that means to maintain the copy board in the loading position may be automatically released as soon as the cover frame is closed so that it may be swung to its vertical or exposure position. As embodied, a spring latch is provided on the front supporting frame 10 and comprises an angle bracket 64, secured on the top reach 14 of frame 10, to which an upstanding leaf spring 66 is fixed. A latch member 67 is attached to the upper end of leaf spring 66 and is provided with a locking shoulder 68 adapted to engage the upper edge of side channel 52 when the cover frame 30 is raised, and a cam surface 69 adapted to be engaged by the side of cover frame 30 when the latter is closed thereby disengaging locking shoulder 68 from channel member 52. Figure 1 shows latch member 67 engaging copy frame 28 and Figure 5 shows cover frame 30 closed and the latch disengaged from the copy frame.

Provision is made for locking the cover frame 30 in its closed position merely by pressing it into that position. As embodied, a latch finger 70 is slidably mounted in a filler block 71, which is welded or otherwise secured in the front end of copy frame side channel 51, and projects outwardly through a suitable aperture in the channel. A cooperating latch bracket 72 is fixed on the corresponding front corner of the cover frame 30 and may be formed of angle stock so as to embrace and stiffen the metal frame 34 at that point. One flange of the angular latch bracket 72 is extended and provided with an aperture 73 into which latch finger 70 may project when the cover frame is closed. A similar latch finger 74 and latch bracket 75 are provided on the opposite front corners of copy frame 28 and cover frame 30 respectively.

Latch fingers 70 and 74 may be interconnected for simultaneous but opposite motion with respect to each other and provided with means common to both for manually withdrawing them from their respective latch brackets 72 and 75 to thereby unlock cover frame 30 from copy frame 28 to permit opening. As shown, an actuating disc 76, mounted inside of the front channel 48, is fixed on a shaft 77, which is journalled at a substantially central point in the web of the channel, and a supplemental bracket 78 secured on the projecting upper surface of the adjacent trunnion bracket 22. One end of a link 79 is attached to the face of disc 76, near its periphery, by a pivot pin 80 and is connected at its other end to the inner end of the latch finger 70 by a pivot pin 81. A similar link 82 is attached at one end to disc 76 by a pivot pin 83 at a point diametrically opposite to pivot 80 and pivotally secured at its other end to the latch finger 74. Thus, rotation of disc 76 serves to move latch fingers 70 and 74 simultaneously but in opposite directions. Latch fingers 70 and 74 are normally maintained in the locking or outer position by a tension spring 84 which may be anchored at one end to filler block 71 and at the other end to a plate 85 secured at a midpoint on link 79. Spring 84 acts on both latch fingers through the medium of the disc 76.

The actuating disc 76 may be manually operated to unlock the closed cover frame 30 by a handle 86 fixed on the outwardly projecting end of disc shaft 77.

In accordance with one object of the invention means are provided to prevent the clockwise rotation of disc 76 (as viewed in Figure 4), and hence the accidental unlocking of the closed cover frame 30, in any position of the copy board except the horizontal. As embodied, the hub of disc 76 has a stop bar 87 secured thereto and extending laterally to a position adjacent to an arm 88 of a bell crank which is pivoted on the inner side of the front channel 48 by a stub shaft 89. The other arm 90 of the bell crank overlies an aperture 91 formed in the lower flange of channel 48. A compression spring 92, interposed between the bell crank arm 88 and an abutment bracket 93 on channel 48 serves to normally hold arm 90 against the channel flange and places the arm 88 in the possible path of travel of the disc stop bar 87. Thus, with the bell crank arms in the position just described the disc 76 cannot be rotated and the latch fingers 70 and 74 cannot be withdrawn from the latch brackets 72 and 75 to permit opening of the copy board. However, when the copy board is in the horizontal position it is necessary that disc 76 is free to be rotated by handle 86 and so unlock the cover frame from the copy frame. To this end means may be provided for automatically shifting the position of bell crank arm 88 out of the path of stop bar 87 and thus free disc 76 for rotation.

As embodied, a release member 94 may be mounted on the front frame 10 adjacent to the trunnion and adapted to project through aperture 91 in the front channel 48 when the copy board reaches its horizontal position. Bell crank arm 90, which overlies aperture 91, is engaged by the release member 94 whereby the bell crank is swung clockwise (as shown in Figure 4) and moves out of the path of arm 88 thereby freeing disc 76 for its unlocking operation.

Shock absorbing means may be provided to prevent damage to the copy board as it is swung to either its vertical or horizontal position of rest. For the horizontal position a pair of compression springs 95, suitably proportioned and secured on studs, are provided and fixed, one on each support frame 10, in such position as to be engaged by the corners of the copy frame 28 just prior to the time it reaches its final horizontal position. Trunnion brackets 22 may be placed slightly to the left of the center of the copy board (as viewed in Figure 1) so that the unbalanced weight of the board to the right of the trunnions serves to compress springs 95 sufficiently to bring the copy frame side channel 52 into proper horizontal position to be engaged by the spring latch member 67 when the cover frame 30 is opened. The resilient stop for the vertical position of the copy board may comprise one or more spring buttons 97 mounted in the leg or legs 16 of frames 10 in such position as to be engaged by the copy frame 28 just prior to its reaching a vertical position. A shoulder on the spring button 97 is adapted to seat against frame leg 16 as the weight of the copy board compresses the button spring 98 and thereby insures, in a positive manner, that the board is in a true vertical position or is normal to the lens axis of a camera used in conjunction with the copy board.

It will be noted that the invention in the form shown and described herein provides a copy board on which the hinges and locking and latching devices are so arranged and constructed that substantially the entire marginal portion of the board is unobstructed when the cover frame is closed, permitting the use of masks or subject material which might otherwise have to be trimmed to fit them into the copy board.

Safe and proper operation of the copy board is also insured in that the cover frame 30 may only be opened when the board is in its horizontal or loading position and, in addition, the board, when in the loading position with the cover open, cannot, in the ordinary course of procedure, be swung away from the horizontal as it is so held by the spring latch member 67.

The invention in its broader aspects is not limited to the specific mechanisms shown and described but departures may be made therefrom within the scope of the accompanying claims without departing from the principles of the invention and without sacrificing its chief advantages.

What is claimed is:

1. In a copyboard having a back, a frame hinged thereto and a transparent cover for the back, said back and frame being pivotally mounted for movement from a horizontal to a vertical position, the combination of locking means securing the frame to the back and means normally preventing unlocking of the locking means while the back and frame are in vertical position and means brought into contact with and moving the means preventing unlocking on movement of the frame to horizontal position for permitting unlocking in horizontal position.

2. A copyboard according to claim 1 in which the locking means comprises a rotatable member mounted on the back and a pair of push rods moved thereby cooperating with members carried by the frame and the unlocking preventing means comprises a pivotally mounted member on the backing member movable into and out of engagement with the rotatable member.

3. A copyboard according to claim 2 in which resilient members on the frame cooperate with the push rods and permit locking of the frame in any position of the backing member.

JOHN D. MAXWELL.

REFERENCES CITED

The following references are of record in the file of this patent:

UNITED STATES PATENTS

| Number | Name | Date |
|---|---|---|
| 1,209,419 | Farquhar | Dec. 19, 1916 |
| 1,401,902 | Fruwirth | Dec. 27, 1921 |
| 1,834,897 | Caps | Dec. 1, 1931 |
| 2,420,023 | Wekeman | May 6, 1947 |
| 2,512,182 | Sussin | June 20, 1950 |

FOREIGN PATENTS

| Number | Country | Date |
|---|---|---|
| 863,452 | France | Jan. 2, 1941 |